US011433747B2

(12) United States Patent
Hirozawa et al.

(10) Patent No.: US 11,433,747 B2
(45) Date of Patent: Sep. 6, 2022

(54) VEHICLE HAVING A CANOPY DOOR

(71) Applicant: Toyota Jidosha Kabushiki Kaisha, Toyota (JP)

(72) Inventors: Yasunori Hirozawa, Okazaki (JP); Hiroki Hashimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 16/774,400

(22) Filed: Jan. 28, 2020

(65) Prior Publication Data
US 2020/0262276 A1  Aug. 20, 2020

(30) Foreign Application Priority Data

Feb. 20, 2019  (JP) .............................. JP2019-028152

(51) Int. Cl.
*B60J 5/10* (2006.01)
*B60R 3/00* (2006.01)

(52) U.S. Cl.
CPC ................. *B60J 5/101* (2013.01); *B60R 3/00* (2013.01)

(58) Field of Classification Search
CPC ..... B60J 7/16; B60J 7/1671; B60J 5/02; B60J 7/1628; B60J 7/1657; B60J 7/1642; B60J 5/102; B60J 5/101; B60R 3/00
USPC ..................... 296/146.8, 216.02, 151, 193.12
See application file for complete search history.

(56) References Cited

U.S. PATENT DOCUMENTS

| 2,656,214 A * | 10/1953 | Alamagny | ............ B62D 31/00 296/193.01 |
| 2,777,728 A * | 1/1957 | Barenyi | ................ B60J 5/0472 296/216.02 |
| 2,947,567 A * | 8/1960 | Barenyi | ................ B62D 31/00 296/193.12 |
| 5,806,622 A * | 9/1998 | Murphy | ................ B60K 26/02 180/210 |
| 5,934,703 A | 8/1999 | Mimura et al. | |
| 10,137,765 B2 * | 11/2018 | Gong | ..................... B60J 5/0472 |
| 2007/0120395 A1 | 5/2007 | Geyrhofer et al. | |
| 2021/0032924 A1 * | 2/2021 | George | ..................... B60J 1/17 |

FOREIGN PATENT DOCUMENTS

| FR | 2852912 A1 * | 10/2004 | ............ B60J 5/0473 |
| JP | 50-5150 Y | 2/1975 | |
| JP | 3-64180 U | 6/1991 | |
| JP | 10-29500 A | 2/1998 | |
| JP | 2005-088711 A | 4/2005 | |
| JP | 2020125064 A * | 8/2020 | |
| WO | WO-2013175812 A1 * | 11/2013 | ............ B60R 13/04 |

* cited by examiner

*Primary Examiner* — D Glenn Dayoan
*Assistant Examiner* — Kevin P Weldon
(74) *Attorney, Agent, or Firm* — Dinsmore & Shohl LLP

(57) ABSTRACT

A vehicle has a door including: a canopy section covering a cabin from above; and a side section bulging outward in a vehicle width direction from the canopy section to cover an upper surface of a body lateral section and formed integrally with the canopy section, in which a front end of the door is attached to a body in a freely rotatable manner, and a rear end of the door is vertically movable to open/close the cabin. The vehicle further has a seat section that supports buttocks of an occupant at the time when the occupant gets in/out and is provided on an upper surface of the body lateral section covered with the side section from above.

9 Claims, 6 Drawing Sheets

VEHICLE HAVING A CANOPY DOOR

CROSS REFERENCE TO RELATED APPLICATION

This application claims priority to Japanese Patent Application No. 2019-028152 filed on Feb. 20, 2019, which is incorporated herein by reference in its entirety including the specification, claims, drawings, and abstract.

TECHNICAL FIELD

The present disclosure relates to a structure of a vehicle body lateral section that has a vertically openable/closable door of a canopy type.

BACKGROUND

A vehicle, to which a vertically openable/closable door of a canopy type is attached, has been proposed, and the vertically openable/closable door of the canopy type is configured such that a windproof body and a side door bar are integrally formed, a front portion of the windproof body is rotatably attached to a vehicle body, and a cabin doorway is opened/closed by vertically moving a rear end of the windproof body (for example, see JP 2005-88711 A).

In the vehicle disclosed in JP 2005-88711 A, an occupant steps across a side sill in a body lateral section to get in the cabin. For such a reason, there is a problem that the occupant possibly finds difficulty in getting in/out of the cabin when the side sill is disposed at a high position and that, while the occupant can easily get in/out of the cabin when the side sill is disposed at a low position, strength of the body lateral section is degraded.

SUMMARY

The present disclosure has a purpose of finding a balance between ease of getting in/out and rigidity of a body lateral section in a vehicle that has a vertically openable/closable door of a canopy type.

A vehicle according to the present disclosure includes a vertically openable/closable door of a canopy type including: a canopy section including a roof, a front windshield, and a side windshield, and projected upward in the vehicle to cover a cabin from above; and a side section bulging outward in a vehicle width direction from the canopy section to cover an upper surface of a body lateral section and formed integrally with the canopy section, wherein a front end of the door is attached to a body in a freely rotatable manner, and a rear end of the door is vertically movable to open and close the cabin. The vehicle according to the present disclosure further includes a seat section that supports buttocks of an occupant at the time when the occupant gets in/out and is provided on an upper surface of the body lateral section covered with the side section from above.

Since the seat section is disposed on the upper surface of the body lateral section, the occupant lifts their legs in a seated state on the seat section, turns their body, and moves both of their legs into the cabin from the outer side of the body. In this way, the occupant can easily be seated on a seat in the cabin. In addition, when getting in the vehicle, the occupant does not have to step across the body lateral section. Thus, rigidity of the body lateral section can be enhanced by positioning a frame member of the body lateral section at a high position. As described, in the present disclosure, it is possible to achieve a good balance between ease of getting in/out and the rigidity of the body lateral section in the vehicle that has the vertically openable/closable door of the canopy type.

In the vehicle according to the present disclosure, the side section may have a lateral portion that is positioned on an outer side of the seat section in the vehicle width direction and extends downward, the body lateral section may be provided with a step that is positioned lower than the upper surface along an outer shape of a lower end of the lateral portion of the side section, and an upper end surface of the step and a lower end of the lateral portion of the side section may define a parting line of the body lateral section when the vertically openable/closable door is closed.

With such a configuration, it is possible to prevent clothing of the occupant from contacting a body outer plate at the time when the occupant gets in the cabin. Thus, it is possible to prevent the clothing of the occupant from being tainted.

In the vehicle according to the present disclosure, the body lateral section may include the frame member that extends in a vehicle longitudinal direction along an outer side of the cabin in the vehicle width direction, and the seat section may be disposed on an upper side of the frame member.

As described, since the seat section is disposed on the frame member, the occupant can apply their entire weight to the seat section, and can easily be seated on the seat by turning their body with the seat section being a start point.

In the present disclosure, it is possible to achieve a good balance between ease of getting in/out and the rigidity of the body lateral section in the vehicle that has the vertically openable/closable door of the canopy type.

BRIEF DESCRIPTION OF DRAWINGS

Embodiment(s) of the present disclosure will be described based on the following figures, wherein.

DESCRIPTION OF EMBODIMENTS

A description will hereinafter be given of a vehicle 100 according to an embodiment, with reference to the drawings. An arrow FR an arrow UP, and an arrow RH illustrated in each of the drawings respectively indicate a front direction (an advancing direction), an up direction, and a right direction of the vehicle 100. In addition, opposite directions of the arrows FR, UP, RH respectively indicate a rear direction, a down direction, and a left direction of the vehicle. When the following description is given simply using the front-rear, right-left, and up-down directions, the front-rear, right-left, and up-down directions respectively indicate front and rear in a vehicle longitudinal direction, right and left in a vehicle lateral direction (a vehicle width direction), and up and down in a vehicle vertical direction unless otherwise noted.

Figure 1:
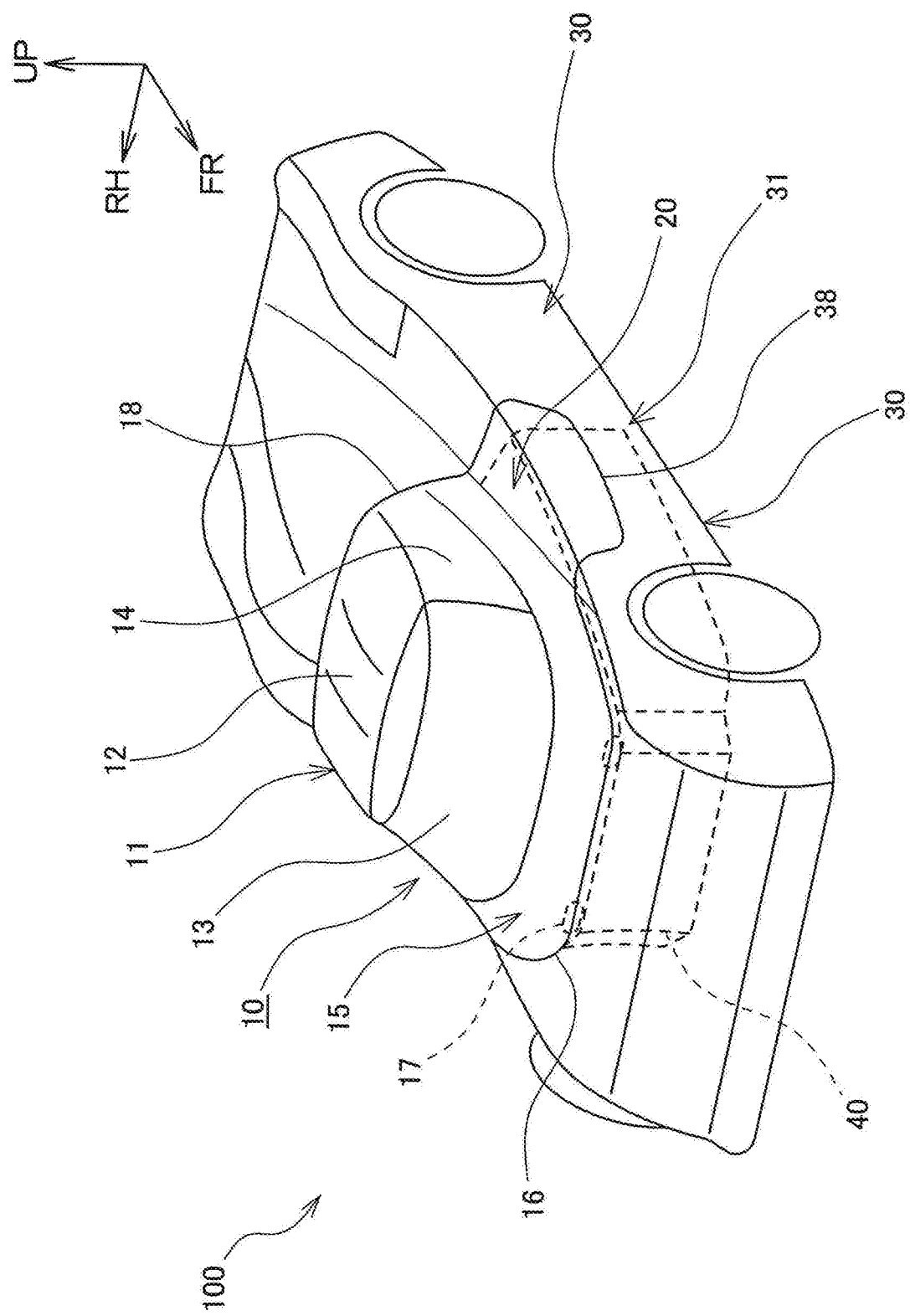
FIG. 1 is a perspective view of a vehicle according to an embodiment in a door closed state.
Figure 2:
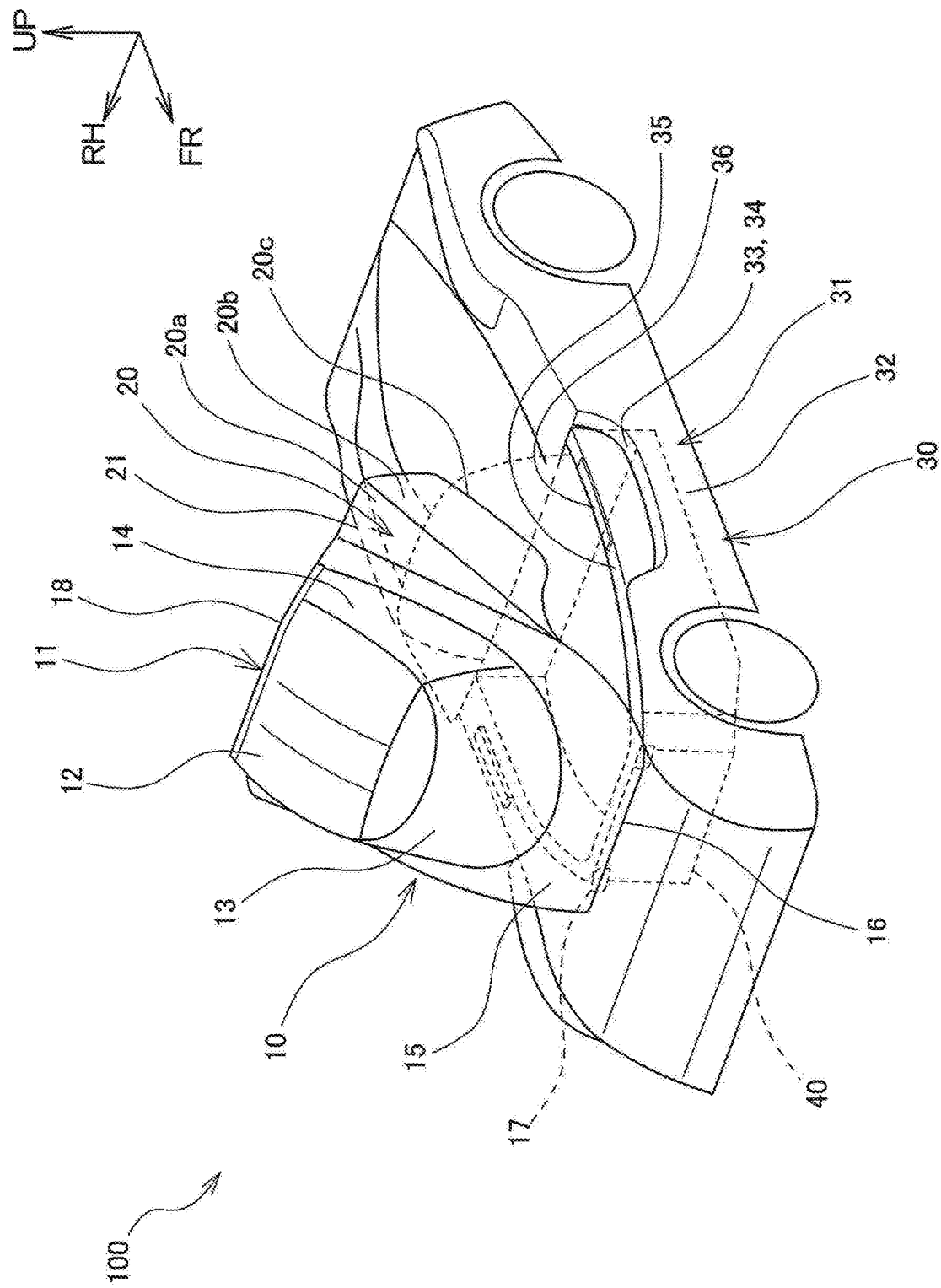
FIG. 2 is a perspective view of the vehicle according to the embodiment in a door open state.

As illustrated in FIGS. 1, 2, the vehicle 100 is provided with a vertically openable/closable door 10 of a canopy type (hereinafter referred to as a door 10) capable of opening/closing a cabin 40 by vertically moving a rear end 18. In the door 10, a canopy section 11, a side section 20, and a front section 15 are integrally formed. The canopy section 11 is a portion that includes a roof 12, a front windshield 13, and a side windshield 14, is projected upward in the vehicle, and covers the cabin 40 from above. The side section 20 is a portion that bulges outward in the vehicle width direction from the canopy section 11 and covers a body lateral section 31 of a body 30 of the vehicle 100 from above. The front section 15 is a portion that bulges forward in the vehicle from the canopy section 11 and covers a front portion of the cabin 40. A hinge 17 is attached to a front end 16 of the front section 15. The front end 16 of the door 10 is attached to the body 30 in a freely rotatable manner by the hinge 17. Then, as illustrated in FIG. 2, the door 10 can open/close the cabin 40 by vertically moving the rear end 18.

Figure 3:
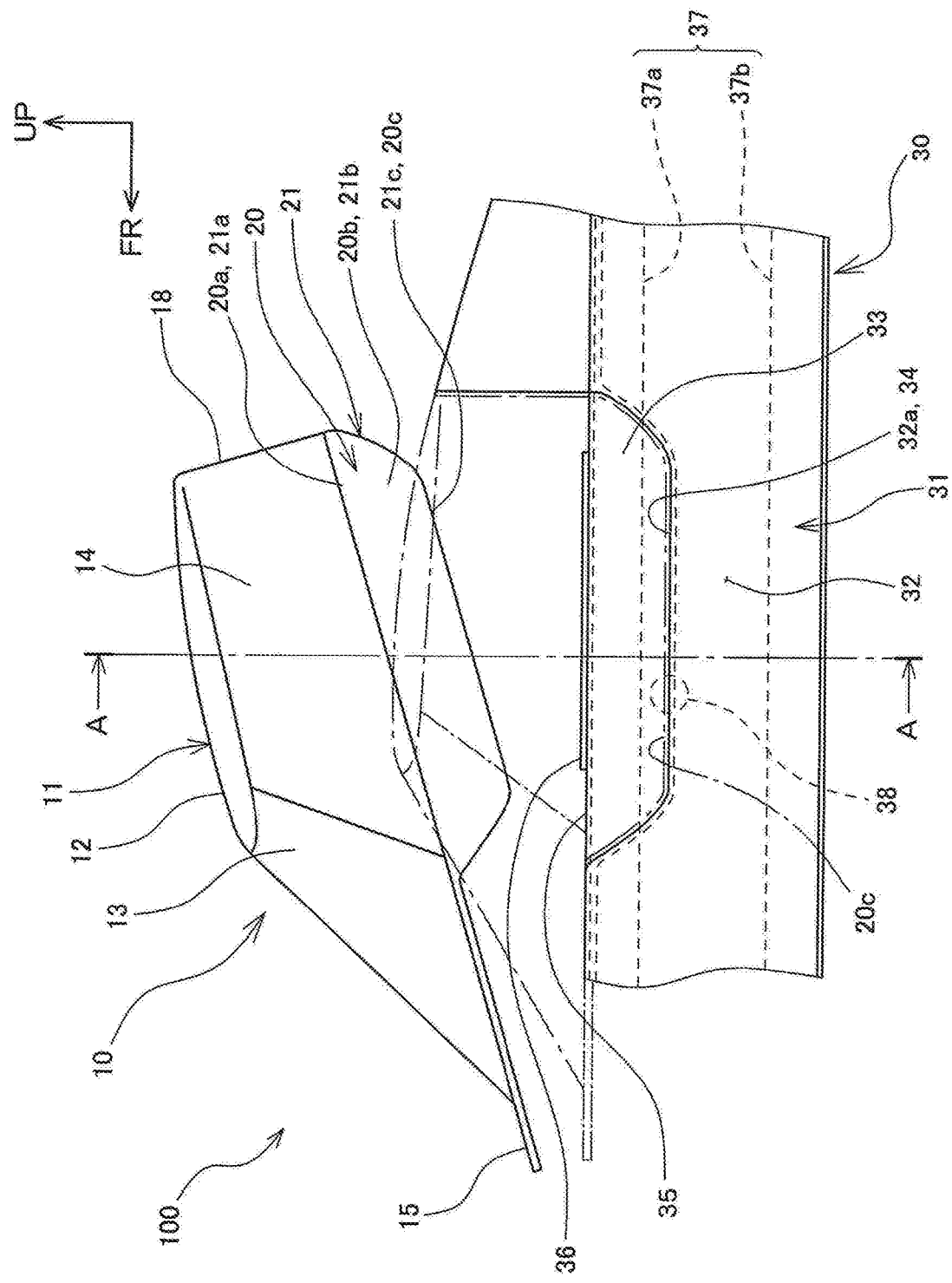
FIG. 3 is a partial side view of the vehicle according to the embodiment in the door open state (solid lines) and the door closed state (one-dot chain lines)
Figure 4:
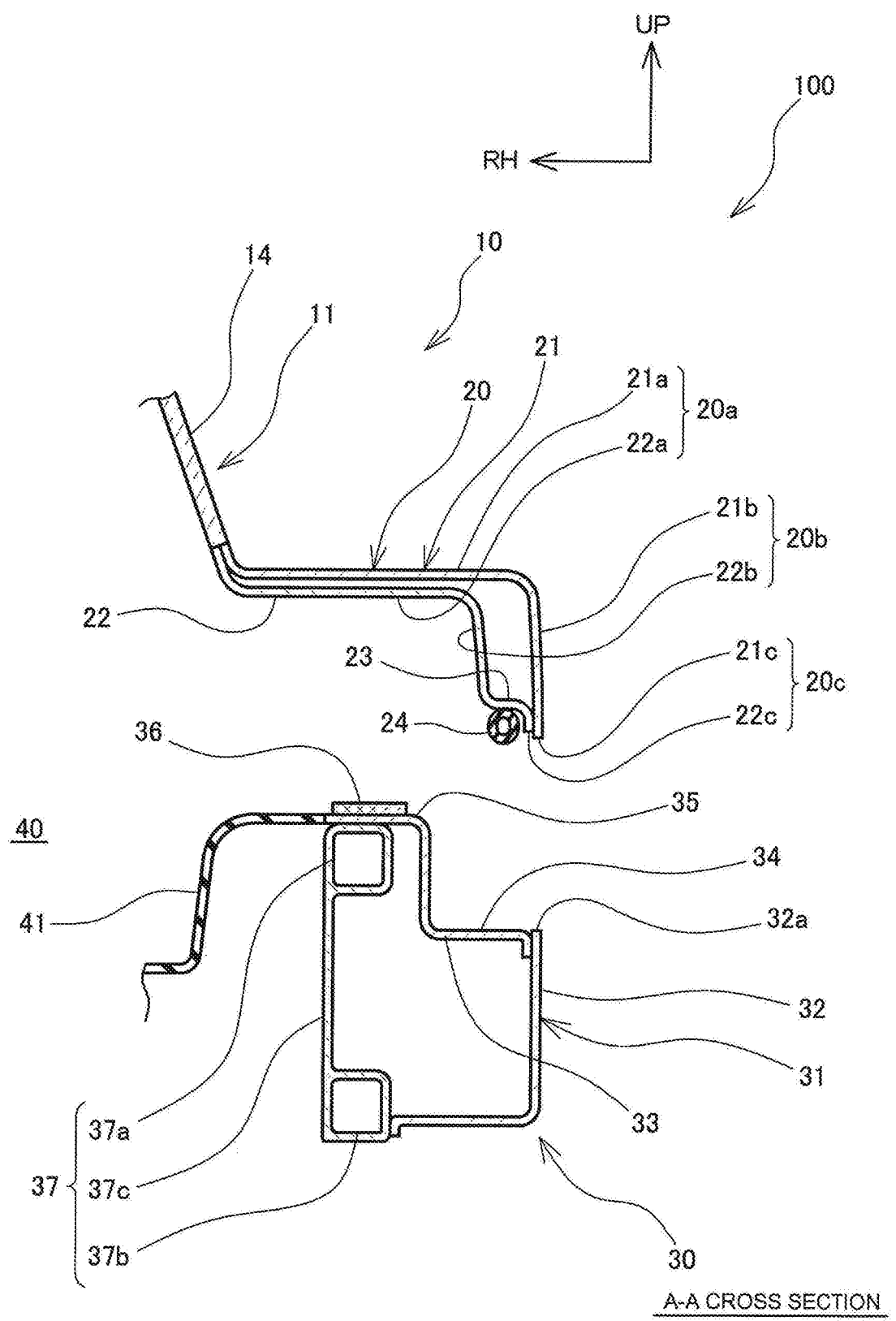
FIG. 4 is a cross-sectional view of the vehicle in the door open state that is indicated by the solid lines in FIG. 3 and is taken along A-A in FIG. 3.

As illustrated in FIGS. 3, 4, the body lateral section 31 is configured to include a body outer panel 32, a body inner panel 33, and a body side member 37. The body outer panel 32 is a plate member that constitutes a design surface of the body 30 and has an L-shaped cross section. As illustrated in FIG. 4, the body inner panel 33 is a plate member that has a crank-shaped cross section, and connects an upper portion of the body outer panel 32 and an upper portion 37a of the body side member 37. The body side member 37 is a frame member that has a cross-sectional shape of connecting the upper portion 37a in a square pipe shape and a lower portion 37b by using a flat plate portion 37c and that extends in the vehicle longitudinal direction along an outer side of the cabin 40 in the vehicle width direction.

A lower portion of the body inner panel 33 extends on the outer side in the vehicle width direction and is connected to an upper end 32a of the body outer panel 32. The lower portion of the body inner panel 33 constitutes a step 34 that is positioned lower than an upper surface 35 of the body lateral section 31. An upper end surface of the step 34 and the upper end 32a of the body outer panel 32 constitute the same plane.

An inner trim 41 that constitutes an inner surface of the cabin 40 and is made of a resin is attached to a center side of the body side member 37 in the vehicle width direction. An upper end surface, which is connected to the body side member 37, in the inner trim 41 and the upper surface 35 of the body lateral section 31 constitute the same plane.

Figure 6:
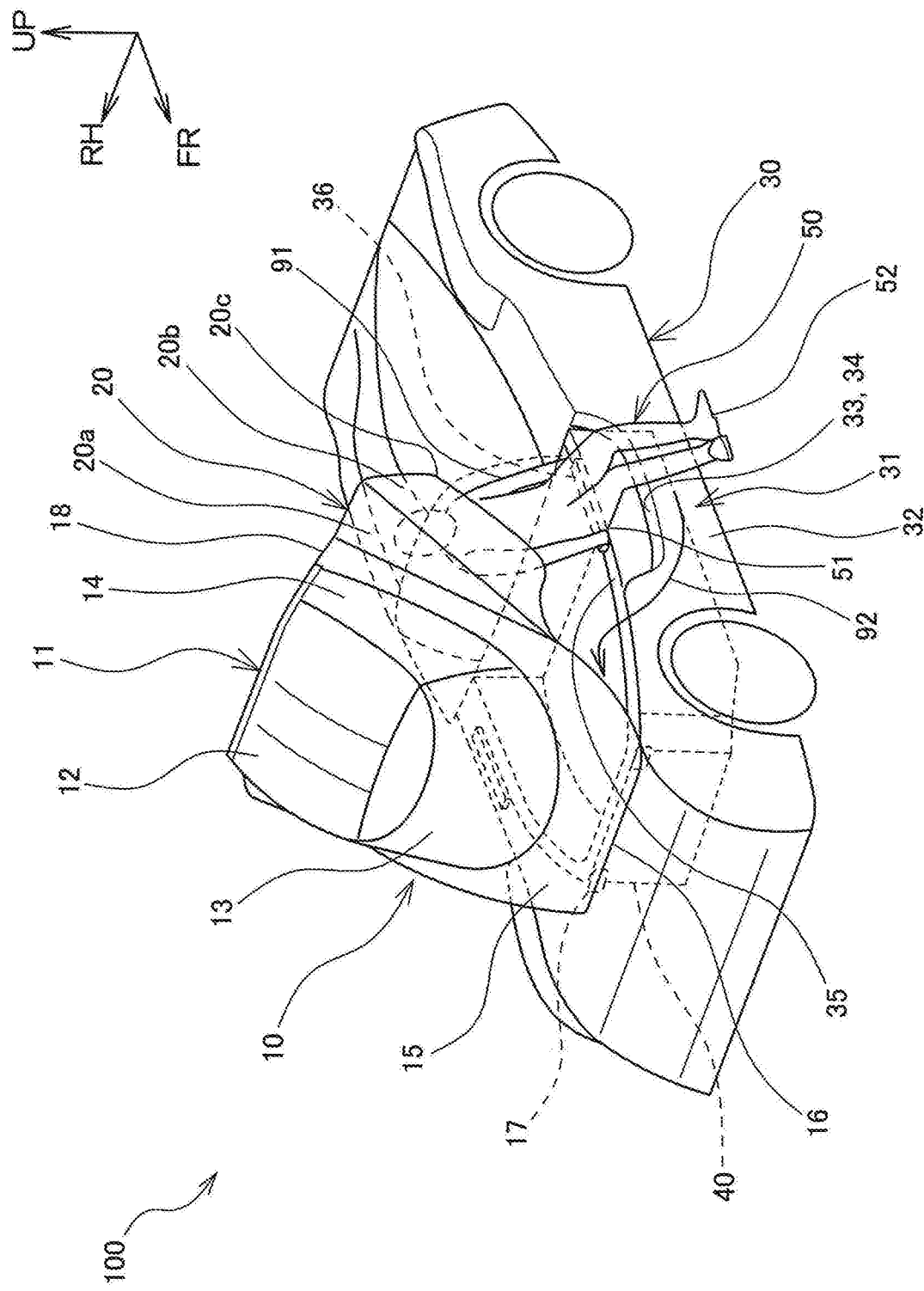
FIG. 6 is a perspective view of getting-in operation of an occupant to a cabin.

A flat plate portion of an upper portion of the body inner panel 33 overlaps and is connected to an upper side of the upper portion 37a of the body side member 37. The upper surface 35 of this flat plate portion constitutes the upper surface 35 of the body lateral section 31, and a seat section 36 is disposed thereon. As illustrated in FIG. 6, the seat section 36 supports buttocks 51 of an occupant 50 when the occupants gets in/out, and is formed of a cushion member. Note that the seat section 36 may be covered with a protection member such as leather such that scratches produced when the occupant 50 is seated thereon are less visible.

As illustrated in FIG. 4, the side section 20 of the door 10 is configured to include a door outer panel 21 and a door inner panel 22. The door outer panel 21 is a plate member that constitutes a design surface of the side section 20 and has an L-shaped cross section, and is configured to include: a bulge portion 21a that bulges outward in the vehicle width direction from the canopy section 11; and a lateral portion 21b that is positioned on the outer side of the seat section 36 in the vehicle width direction that extends downward from the bulge portion 21a toward the body lateral section 31. The door inner panel 22 is a plate member that is positioned on a vehicle inner surface side of the door outer panel 21 and has an L-shaped cross section similar to the door outer panel 21, and includes a bulge portion 22a and a lateral portion 22b. A step 23, to which a weather strip 24 is attached, is formed in a lower portion of the lateral portion 22b. The bulge portions 21a, 22a of the door outer panel 21 and the door inner panel 22 constitute a bulge portion 20a of the side section 20, and the lateral portions 21b, 22b of the door outer panel 21 and the door inner panel 22 constitute a lateral portion 20b of the side section 20. A lower end 21c of the door outer panel 21 is connected to a lower end 22c of the door inner panel 22 so as to constitute a lower end 20c of the lateral portion 22b of the side section 20. A vehicle center side of each of the bulge portions 21a, 22a in the door outer panel 21 and the door inner panel 22 is connected to the canopy section 11, and the side windshield 14 is attached thereto.

Figure 5:
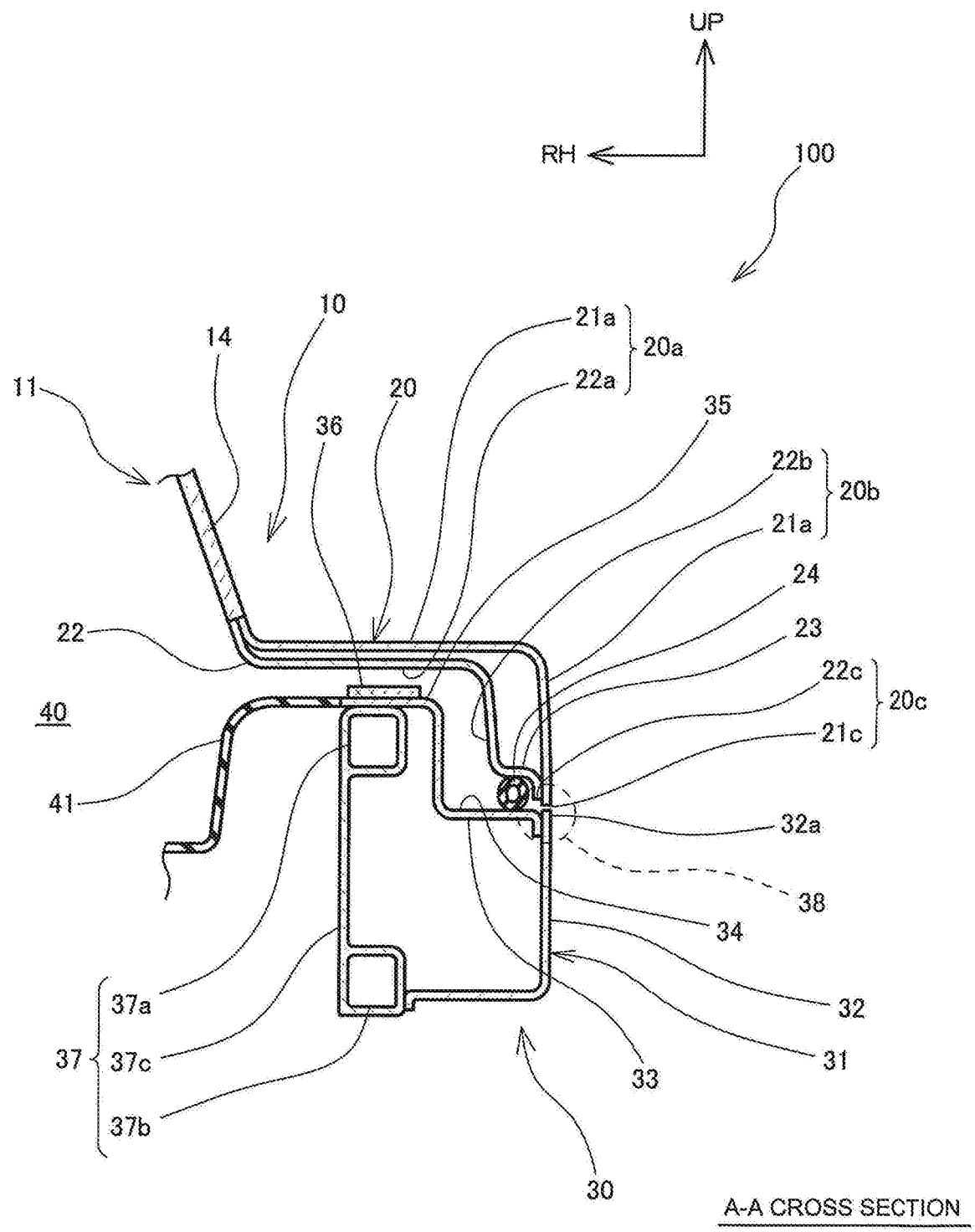
FIG. 5 is a cross-sectional view of the vehicle in the door closed state that is indicated by the one-dot chain lines in FIG. 3 and is taken along A-A in FIG. 3.

When the door 10 is closed as indicated by one-dot chain lines in FIG. 3, as illustrated in FIG. 5 the bulge portion 20a of the side section 20 lays on the upper surface 35 of the body lateral section 31 and covers the upper surface 35 of the body lateral section 31. Meanwhile, the lateral portion 20b of the side section 20 extends downward on the outer side of the seat section 36 in the vehicle width direction, and a lower surface of the step 23 of the door inner panel 22 and an upper surface of the step 34 of the body lateral section 31 hold the weather strip 24 therebetween.

In addition, as illustrated in FIG. 3, the upper end surface of the step 34 of the body lateral section 31 and a central portion of the upper end 32a of the body outer panel 32 are positioned lower than the upper surface 35 along an outer shape of the lower end 20c of the lateral portion 20b in the side section 20. Meanwhile, both ends of each of the upper end surface of the step 34 and the upper end 32a are elevated toward the upper surface 35 along the outer shape of the lower end 20c of the lateral portion 20b in the side section 20. Accordingly, when the door 10 is closed, as indicated by the one-dot chain lines in FIG. 3, as illustrated in FIG. 5 the lower end 20c of the lateral portion 20b of the side section 20 is adjacent to the upper end 32a of the body outer panel 32 and the upper end surface of the step 34 while forming a slight clearance with the upper end 32a of the body outer panel 32 and the upper end surface of the step 34, and defines a parting line 38 of the body lateral section 31.

Next, description will be given on a boarding operation of the occupant 50 into the cabin 40 of the vehicle 100 that is configured as described so far with reference to FIG. 6.

As illustrated in FIG. 6, in an open state of the door 10, the occupant 50 is seated on the seat section 36 provided on the upper surface 35 of the body lateral section 31 with their back into facing the cabin. When the occupant 50 lifts both of their legs 52, weight of the occupant 50 is applied to the seat section 36, and the seat section 36 supports the buttocks 51 of the occupant 50.

The occupant 50 lifts their legs 52 in a seated state on the seat section 36, turns their body as indicated by an arrow 92 in FIG. 6, and moves both of their legs 52 into the cabin 40 from the outer side of the body 30. Then, the occupant 50 places their legs 52 on the cabin 40 and is seated on a seat in the cabin 40.

As described, in the vehicle 100 according to the embodiment, when getting into the vehicle 100, the occupant 50 does not have to step across the body lateral section 31. Thus, the occupant 50 can easily get in/out of the vehicle 100. Accordingly, rigidity of the body lateral section 31 can be enhanced by positioning the upper portion 37a of the body side member 37 as the frame member of the body lateral section 31 at a high position. As described, it is possible to achieve a balance between ease of getting in/out and the rigidity of the body lateral section 31 in the vehicle 100 according to this embodiment that has the vertically openable/closable door 10 of the canopy type.

In addition, the lower end 20c of the side section 20 of the door 10 extends around to a lateral surface of the body lateral section 31, and the step 34 is provided in this portion of the body lateral section 31. In this way, a clearance in the vehicle width direction and the vehicle vertical direction is provided between the seat section 36 and the upper end 32a of the body outer panel 32. As a result, it is possible to prevent clothing such as pants of the occupant 50 from contacting an outer surface of the body outer panel 32 when the occupant 50 is seated on the seat section 36, and thus it is possible to prevent the clothing of the occupant 50 from being tainted at the time of getting in/out.

The invention claimed is:

1. A vehicle comprising:
a vertically openable/closable door of a canopy type including:
a canopy section including a roof, a front windshield, and a side windshield and projected upward in the vehicle to cover a cabin from above; and
a side section bulging outward in a width direction of the vehicle from the canopy section to closely cover an upper surface of a body lateral section and formed integrally with the canopy section, wherein a front end of the door is attached to a body in a freely rotatable manner, and a rear end of the door is vertically movable to open and close the cabin; and
a seat section that supports buttocks of an occupant when the occupant gets in/out and is provided on the upper surface of the body lateral section covered with the side section from above.

2. The vehicle according to claim 1, wherein
the side section has a lateral portion that is positioned on an outer side of the seat section in the vehicle width direction and extends downward,
the body lateral section is provided with a step that is positioned lower than the upper surface, and
an upper end surface of the step and a lower end of the lateral portion of the side section define a parting line of the body lateral section when the vertically openable/closable door is closed.

3. The vehicle according to claim 1, wherein
the body lateral section includes a frame member that extends in a longitudinal direction of the vehicle along an outer side of the cabin in the vehicle width direction, and
the seat section is disposed on an upper side of the frame member.

4. The vehicle according to claim 2, wherein
the body lateral section includes a frame member that extends in a longitudinal direction of the vehicle along an outer side of the cabin in the vehicle width direction, and
the seat section is disposed on an upper side of the frame member.

5. The vehicle according to claim 2, wherein
a step is formed in a lower portion of the lateral portion,
a weather strip is attached to the step in the lower portion of the lateral portion, and
the step of the lower portion of the lateral portion and the step of the body lateral section hold the weather strip therebetween when the vertically openable/closable door is closed.

6. A vehicle comprising:
a vertically openable/closable door of a canopy type including:
a canopy section including a roof, a front windshield, and a side windshield and projected upward in the vehicle to cover a cabin from above; and
a side section bulging outward in a width direction of the vehicle from the canopy section to cover an upper surface of a body lateral section and formed integrally with the canopy section, wherein a front end of the door is attached to a body in a freely rotatable manner, and a rear end of the door is vertically movable to open and close the cabin; and
a seat section that supports buttocks of an occupant when the occupant gets in/out and is provided on the upper surface of the body lateral section covered with the side section from above,
the side section has a lateral portion that is positioned on an outer side of the seat section in the vehicle width direction and extends downward,
the body lateral section is provided with a step that is positioned lower than the upper surface, and
an upper end surface of the step and a lower end of the lateral portion of the side section define a parting line of the body lateral section when the vertically openable/closable door is closed.

7. The vehicle according to claim 6, wherein
the body lateral section includes a frame member that extends in a longitudinal direction of the vehicle along an outer side of the cabin in the vehicle width direction, and
the seat section is disposed on an upper side of the frame member.

8. The vehicle according to claim 6, wherein
the body lateral section includes a frame member that extends in a longitudinal direction of the vehicle along an outer side of the cabin in the vehicle width direction, and
the seat section is disposed on an upper side of the frame member.

9. The vehicle according to claim 6, wherein
a step is formed in a lower portion of the lateral portion,
a weather strip is attached to the step in the lower portion of the lateral portion, and
the step of the lower portion of the lateral portion and the step of the body lateral section hold the weather strip therebetween when the vertically openable/closable door is closed.

* * * * *